(12) United States Patent
Jang et al.

(10) Patent No.: US 7,053,790 B2
(45) Date of Patent: May 30, 2006

(54) REMOTE METER READING SYSTEM USING GROUPED DATA STRUCTURE

(75) Inventors: Moon Jong Jang, Daejeon (KR); Seon Ku Cho, Daejeon (KR); Bong Jae Lee, Daejeon (KR); Jin Ho Shin, Daejeon (KR); Jae Hee Lee, Seoul (KR); Eui Yeul Kim, Seoul (KR); Keon Hang Lee, Seoul (KR)

(73) Assignee: Korea Electric Power Corporation (KR)

( * ) Notice: Subject to any disclaimer, the term of this patent is extended or adjusted under 35 U.S.C. 154(b) by 439 days.

(21) Appl. No.: 10/627,071

(22) Filed: Jul. 24, 2003

(65) Prior Publication Data

US 2004/0066309 A1   Apr. 8, 2004

(30) Foreign Application Priority Data

Jul. 24, 2002   (KR) .................. 10-2002-0043556

(51) Int. Cl.
*G08B 23/00* (2006.01)
(52) U.S. Cl. ................................. 340/870.02; 702/80
(58) Field of Classification Search .......... 340/870.02, 340/310.01; 702/57, 80
See application file for complete search history.

(56) References Cited

U.S. PATENT DOCUMENTS 4,247,786 A * 1/1981 Hedges ........................ 307/35
4,749,992 A * 6/1988 Fitzemeyer et al. ... 340/870.02
5,099,348 A * 3/1992 Huddleston et al. ......... 398/107
5,537,029 A * 7/1996 Hemminger et al. ........ 324/142
6,512,463 B1 * 1/2003 Campbell et al. ...... 340/870.02
2001/0019321 A1 * 9/2001 Brooksby et al. ............. 345/87

* cited by examiner

*Primary Examiner*—Timothy Edwards, Jr.
(74) *Attorney, Agent, or Firm*—Cantor Colburn LLP

(57) ABSTRACT

The present invention relates to a remote meter reading system using a grouped data structure. The central processing unit of the electronic electric power meter collects the data having similar function and groups the same. Each group is classified into main items, and each main item is classified into sub-items and is stored in the memory apparatus, and when a data transmission request signal of the wired and wireless meter reading terminal and the remote meter reading server is inputted in accordance with a data address system corresponding to a grouped data stored in the memory apparatus, a collecting data corresponding to the data address system that the data transmission request signal represents is selected, and is transmitted to the wired and wireless meter reading terminal and the remote meter reading server, respectively. Therefore, when the meter reader collects a data of the electronic electric power meter at the current place, it is possible to decrease the meter reading time by collecting only the data needed. The work time is decreased. Since only the data needed for the work is stored, it is possible to save the space of the memory apparatus. Only the data needed is received, and the work is performed, an expensive equipment is not needed.

2 Claims, 13 Drawing Sheets

Fig. 3

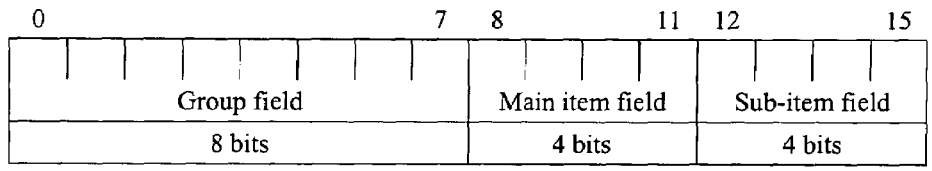

Fig. 4

| Data group | Classification code | Functions |
|---|---|---|
| gauge setting group | 0x01FF | gauge, LCD, LCD output item, setting |
| meter reading group | 0x02FF | meter reading method, LP setting, demand power setting |
| rate setting group | 0x03FF | TOU, holiday, sun light saving setting |
| gauge state group | 0x04FF | basic information, meter reading, gauge, communication, power failure information |
| meter reading date group | 0x05FF | meter reading data before 6 months with reference to current month |
| maximum demand power data group | 0x06FF | LP data by periods |
| reservation gauge setting group | 0x11FF | gauge, LCD, LCD output item, modem setting |
| reservation meter reading group | 0x12FF | meter reading method, LP setting, demand power setting |
| reservation rate setting group | 0x13FF | TOU, holiday, sun light saving setting |

Fig. 5

| Main item | Detailed items | | Memory region | | |
|---|---|---|---|---|---|
| | | | Byte | Type | Code |
| 1.instrument setting (0x011F) | 1.current program name | | 8 | R/W | 0x0111 |
| | 2.reservation program name | | 12 | R/W | 0x0112 |
| | 3.password | Super | 4 | R/W | 0x0113 |
| | | R/W | 4 | R/W | 0x0114 |
| | | R/O | 4 | R/W | 0x0115 |
| | 4.electronic transformer multiple | | 4 | R/W | 0x0116 |
| | 5.Reg k | | 2 | R/W | 0x0117 |
| | 6.Scale Factor | | 1 | R/W | 0x0118 |
| | 7.Pulse initiator | | 1 | R/W | 0x0119 |
| | 8.KYZ divisor | | 1 | R/W | 0x011A |
| | 9.Pules width | | 1 | R/W | 0x011B |
| 2.LCD setting (0x012F) | 1.event and error display | | 1 | R/W | 0x0121 |
| | 2.scroll time | | 1 | R/W | 0x0122 |
| | 3.data format | | 5 | R/W | 0x0123 |
| | 4.common mode auto returning time | | 1 | R/W | 0x0124 |
| | 5.blank | | 1 | R/W | 0x0125 |
| | 6.date display | | 1 | R/W | 0x0126 |
| | 7.time display | | 1 | R/W | 0x0127 |
| | 8.LCD stop for error | | 1 | R/W | 0x0128 |
| | 9.EOI, DR display duration time | | 1 | R/W | 0x0129 |
| 3.LCD output item (0x013F) | 1.common mode | | 90 | R/W | 0x0131 |
| | 2.selection mode | | 90 | R/W | 0x0132 |
| | 3.test mode | | 90 | R/W | 0x0133 |
| 4.modem setting (0x014F) | 1.modem kind | | 1 | R/W | 0x0141 |
| | 2.initialization command | | 30 | R/W | 0x0142 |
| | 3.number of retrials | | 1 | R/W | 0x0143 |
| | 4.reponse standby time | | 2 | R/W | 0x0144 |
| | 5.telephone number 1 | | 20 | R/W | 0x0145 |
| | 6.telephone number 2 | | 20 | R/W | 0x0146 |
| | 7.telephone number 3 | | 20 | R/W | 0x0147 |
| | 8.modem communication speed | | 2 | R/W | 0x0148 |
| 5.command group (0x015F) | 1.common function command code | | 2 | R/W | 0x0151 |

* R/W – Read and Write

Fig. 6

| Main item | Detailed items | Memory region | | |
|---|---|---|---|---|
| | | Byte | Type | Code |
| 1.meter reading method (0x021F) | 1.meter reading operation condition | 1 | R/W | 0x0211 |
| | 2.periodic meter reading date | 1 | R/W | 0x0212 |
| | 3.non-periodic meter reading date | 2*12 | R/W | 0x0213 |
| | 4.selection valid power amount | 1 | R/W | 0x0214 |
| | 5.selection invalid power amount | 1 | R/W | 0x0215 |
| | 6.selection apparent power amount | 1 | R/W | 0x0216 |
| 2.LP setting (0x022F) | 1.LP channel | 4 | R/W | 0x0221 |
| | 2.LP storing period | 1 | R/W | 0x0222 |
| 3.demand power (0x023F) | 1.demand interval | 1 | R/W | 0x0231 |
| | 2.sub-demand limit period(number) | 1 | R/W | 0x0232 |
| | 3.demand delay time | 1 | R/W | 0x0233 |
| | 4.delay possible power failure time | 1 | R/W | 0x0234 |
| | 5.demand exceeding value setting | 4 | R/W | 0x0235 |
| | 6.setting limit time | 1 | R/W | 0x0236 |
| | 7.EOI closure time | 1 | R/W | 0x0237 |
| | 8.demand reset setting condition | 1 | R/W | 0x0238 |
| | 9.specfic date after period | 1 | R/W | 0x0239 |
| | 10.demand power measuring method | 1 | R/W | 0x023A |

Fig. 7

| Main item | Detailed items | Memory region | | |
|---|---|---|---|---|
| | | Byte | Type | Code |
| 1.TOU setting (0x031F) | 1.season | 3B*8 | R/W | 0x0311 |
| | 2.day | (1+3*8)*8 | R/W | 0x0312 |
| | 3.season based day adaptation | 8*8B | R/W | 0x0313 |
| 2.holiday input (0x032F) | 1.periodic holiday | 3B*20 | R/W | 0x0321 |
| | 2.non-periodic holiday | 5B*20*7 | R/W | 0x0322 |
| 3.sun light saving (0x033F) | 1.sun light saving setting | 1 | R/W | 0x0331 |
| | 2.start month and date | 2 | R/W | 0x0332 |
| | 3.ending month and date | 2 | R/W | 0x0333 |

Fig. 8

| Main item | Detailed items | Memory region | | |
|---|---|---|---|---|
| | | Byte | Type | Code |
| 1.basic (0x041F) | 1.gauge firm ware version | 5 | RO | 0x0411 |
| | 2.gauge ID | 6 | RO | 0x0412 |
| | 3.supply method | 1 | RO | 0x0413 |
| | 4.current time | 8 | RO | 0x0414 |
| | 5.first program setting date and time | 7 | RO | 0x0415 |
| | 6.current program setting date and time | 7 | RO | 0x0416 |
| | 7.date and time before change | 7*10 | RO | 0x0417 |
| | 8.date and time after change | 7*10 | RO | 0x0418 |
| 2.meter reading (0x042F) | 1.current season | 1 | RO | 0x0421 |
| | 2.current day classification | 1 | RO | 0x0422 |
| | 3. current rate | 1 | RO | 0x0423 |
| | 4. contract demand exceeding record | 10*10 | RO | 0x0424 |
| | 5. contract demand exceeding number | 2 | RO | 0x0425 |
| | 6. DR date and time and kind | 8*10 | RO | 0x0426 |
| | 7.DR occurrence number | 2 | RO | 0x0427 |
| | 8.meter reading date and time history and kind | 8*10 | RO | 0x0428 |
| | 9.meter reading operation accumulation number | 2 | RO | 0x0429 |
| | 10.communication date and time history and kind | 8*10 | RO | 0x042A |
| | 11.communication accumulation occurrence number | 2 | RO | 0x042B |
| 3.error, event flag (0x043F) | 1.gauge error flag | 1 | RO | 0x0431 |
| | 2.gauge event flag | 1 | RO | 0x0432 |
| 4.error log (0x044F) | 1.gauge error accumulation number | 2 | RO | 0x0441 |
| | 2.gauge error log | 8*10 | RO | 0x0442 |
| | 3.gauge error recovery log | 8*10 | RO | 0x0443 |
| 5.communication speed (0x045F) | 1.modem speed | 2 | RO | 0x0451 |
| | 2.optical port | 2 | RO | 0x0452 |

Fig. 9

| Main item | Detailed items | Memory region | | |
|---|---|---|---|---|
| | | Byte | Type | Code |
| 6.power failure (0x046F) | 1.power failure accumulation time | 5 | RO | 0x0461 |
| | 2.last power failure recovery record | 14*2 | RO | 0x0462 |
| | 3.power failure recovery record | 14*10 | RO | 0x0463 |
| | 4.power failure occurrence number | 2 | RO | 0x0464 |
| | 5.battery remaining period | 3 | RO | 0x0465 |
| | 6.battery exchange date and time | 5 | RO | 0x0466 |
| 7.common information log (0x047F) | 1.forward direction instantaneous valid power | 4B*4 | RO | 0x0471 |
| | 2.reverse direction instantaneous valid power | 4B*4 | RO | 0x0472 |
| | 3.ground instantaneous valid power | 4B*4 | RO | 0x0473 |
| | 4.phase advanced invalid power | 4B*4 | RO | 0x0474 |
| | 5.instantaneous apparent power | 4B*4 | RO | 0x0475 |
| | 6.instantaneous voltage | 4B*3 | RO | 0x0476 |
| | 7.instantaneous current | 4B*3 | RO | 0x0477 |
| | 8.current energy upper limit | 1 | RO | 0x0478 |
| | 9.instantaneous power factor | 4 | RO | 0x0479 |
| | 10.instantaneous frequency | 4B*3 | RO | 0x047A |
| | 11.battery volt | 4 | RO | 0x047B |
| 8.LP basic information (0x048F) | 1.LP start time | 6 | RO | 0x0481 |
| | 2.LP ending time | 6 | RO | 0x0482 |
| | 3.LP accumulation case number | 2 | RO | 0x0483 |
| | 4.LP overlap count | 1 | RO | 0x0484 |
| 9.communication error log (0x049F) | 1.communication error accumulation number | 2 | RO | 0x0491 |
| | 2.communication error log | 8*10 | RO | 0x0492 |
| | 3.communication error recovery log | 8*10 | RO | 0x0493 |

Fig. 10

| Main item | Detailed times | Memory region | | |
|---|---|---|---|---|
| | | Byte | Type | Code |
| 1.energy (0x051F) | Current month | 4B*9*5 | RO | 0x0511 |
| | - Jan | " | RO | 0x0512 |
| | - Feb | " | RO | 0x0513 |
| | - Mar | " | RO | 0x0514 |
| | - Apr | " | RO | 0x0515 |
| | - May | " | RO | 0x0516 |
| | - Jun | " | RO | 0x0517 |
| 2.demand power (0x052F) | Current month | 4B*9*5 | RO | 0x0521 |
| | - Jan | " | RO | 0x0522 |
| | - Feb | " | RO | 0x0523 |
| | - Mar | " | RO | 0x0524 |
| | - Apr | " | RO | 0x0525 |
| | - May | " | RO | 0x0526 |
| | - Jun | " | RO | 0x0527 |
| 3.accumulation demand power (0x053F) | Current month | 4B*9*5 | RO | 0x0531 |
| | - Jan | " | RO | 0x0532 |
| | - Feb | " | RO | 0x0533 |
| | - Mar | " | RO | 0x0534 |
| | - Apr | " | RO | 0x0535 |
| | - May | " | RO | 0x0536 |
| | - Jun | " | RO | 0x0537 |
| 4.continuous accumulation demand power (0x054F) | Current month | 4B*9*5 | RO | 0x0541 |
| | - Jan | " | RO | 0x0542 |
| | - Feb | " | RO | 0x0543 |
| | - Mar | " | RO | 0x0544 |
| | - Apr | " | RO | 0x0545 |
| | - May | " | RO | 0x0546 |
| | - Jun | " | RO | 0x0547 |
| 5.maximum demand occurrence date and time (0x055F) | Current month | 7B*9*5 | RO | 0x0551 |
| | - Jan | " | RO | 0x0552 |
| | - Feb | " | RO | 0x0553 |
| | - Mar | " | RO | 0x0554 |
| | - Apr | " | RO | 0x0555 |
| | - May | " | RO | 0x0556 |
| | - Jun | " | RO | 0x0557 |
| 6.maximum continuous accumulation demand occurrence date and time (0x056F) | Current month | 7B*9*5 | RO | 0x0561 |
| | - Jan | " | RO | 0x0562 |
| | - Feb | " | RO | 0x0563 |
| | - Mar | " | RO | 0x0564 |
| | - Apr | " | RO | 0x0565 |
| | - May | " | RO | 0x0566 |
| | - Jun | " | RO | 0x0567 |

Fig. 11

| Main item | Detailed items | Memory region | | |
|---|---|---|---|---|
| | | Byte | Type | Code |
| 7. demand power occurrence power factor 1 (0x057F) | Current month | | RO | 0x0571 |
| | - Jan | | RO | 0x0572 |
| | - Feb | | RO | 0x0573 |
| | - Mar | | RO | 0x0574 |
| | - Apr | | RO | 0x0575 |
| | - May | | RO | 0x0576 |
| | - Jun | | RO | 0x0577 |
| 8. demand power occurrence power factor 2 (0x058F) | Current month | | RO | 0x0581 |
| | - Jan | | RO | 0x0582 |
| | - Feb | | RO | 0x0583 |
| | - Mar | | RO | 0x0584 |
| | - Apr | | RO | 0x0585 |
| | - May | | RO | 0x0586 |
| | - Jun | | RO | 0x0587 |
| 9. average power factor 1 (0x059F) | Current month | | RO | 0x0591 |
| | - Jan | | RO | 0x0592 |
| | - Feb | | RO | 0x0593 |
| | - Mar | | RO | 0x0594 |
| | - Apr | | RO | 0x0595 |
| | - May | | RO | 0x0596 |
| | - Jun | | RO | 0x0597 |
| 10. average power factor 2 (0x05AF) | Current month | | RO | 0x05A1 |
| | - Jan | | RO | 0x05A2 |
| | - Feb | | RO | 0x05A3 |
| | - Mar | | RO | 0x05A4 |
| | - Apr | | RO | 0x05A5 |
| | - May | | RO | 0x05A6 |
| | - Jun | | RO | 0x05A7 |
| 11. previous limit demand power (0x05BF) | Demand power | | RO | 0x05B1 |
| | Power factor | | RO | 0x05B2 |
| 12. maximum demand power occurrence history (0x05CF) | Occurrence date | | RO | 0x05C1 |
| | Demand power | | RO | 0x05C2 |
| | Power factor | | RO | 0x05C3 |

Fig. 12

| Main Item | Detailed items | Memory region | | |
|---|---|---|---|---|
| | | Byte | Type | Code |
| 1.LP data : 15 min (0x061F) | 1. LP register | 12B | RO | 0x0611 |
| 2.LP data : 1 hour (0x062F) | 1. LP register | 12B*4 | RO | |
| 3.LP data : 1 day (0x063F) | 1. LP register | 12B*96 | RO | 0x0631 |
| 4.LP data : 1 week (0x064F) | 1. LP register | 12B*672 | RO | 0x0641 |
| 5.LP data : 30 days (0x065F) | 1. LP register | 12B*2880 | RO | 0x0651 |
| 6.LP data : 90 days (0x066F) | 1. LP register | 12B*8640 | RO | 0x0661 |
| 7.LP data : entire (0x06FF) | 1. LP register | 12B*∞ | RO | |

Fig. 13

| Main item | Detailed items | | Memory region | | |
|---|---|---|---|---|---|
| | | | Byte | Type | Code |
| 1.instrument setting (0x111F) | 1.current program name | | 8 | R/W | 0x1111 |
| | 2.reservation program name | | 12 | R/W | 0x1112 |
| | 3.password | Super | 4 | R/W | 0x1113 |
| | | R/W | 4 | R/W | 0x1114 |
| | | R/O | 4 | R/W | 0x1115 |
| | 4.electronic transformer multiple | | 4 | R/W | 0x1116 |
| | 5.Reg k | | 2 | R/W | 0x1117 |
| | 6.Scale Factor | | 1 | R/W | 0x1118 |
| | 7.Pulse initiator | | 1 | R/W | 0x1119 |
| | 8.KYZ divisor | | 1 | R/W | 0x111A |
| | 9.Pules width | | 1 | R/W | 0x111B |
| 2.LCD setting (0x112F) | 1.event and error display | | 1 | R/W | 0x1121 |
| | 2.scroll time | | 1 | R/W | 0x1122 |
| | 3.data format | | 5 | R/W | 0x1123 |
| | 4.common mode auto returning time | | 1 | R/W | 0x1124 |
| | 5.blank | | 1 | R/W | 0x1125 |
| | 6.date display | | 1 | R/W | 0x1126 |
| | 7.time display | | 1 | R/W | 0x1127 |
| | 8.LCD stop for error | | 1 | R/W | 0x1128 |
| | 9.EOI, DR display duration time | | 1 | R/W | 0x1129 |
| 3.LCD output item (0x113F) | 1.common mode | | 90 | R/W | 0x1131 |
| | 2.selection mode | | 90 | R/W | 0x1132 |
| | 3.test mode | | 90 | R/W | 0x1133 |
| 4.modem setting (0x114F) | 1.modem kind | | 1 | R/W | 0x1141 |
| | 2.initialization command | | 30 | R/W | 0x1142 |
| | 3.number of retrials | | 1 | R/W | 0x1143 |
| | 4.reponse standby time | | 2 | R/W | 0x1144 |
| | 5.telephone number 1 | | 20 | R/W | 0x1145 |
| | 6.telephone number 2 | | 20 | R/W | 0x1146 |
| | 7.telephone number 3 | | 20 | R/W | 0x1147 |
| | 8.modem communication speed | | 2 | R/W | 0x1148 |
| 5.command group (0x115F) | 1.common function command code | | 2 | R/W | 0x1151 |

Fig. 14

| Main item | Detailed items | Memory region | | |
|---|---|---|---|---|
| | | Byte | Type | Code |
| 1.meter reading method (0x121F) | 1.meter reading operation condition | 1 | R/W | 0x1211 |
| | 2.periodic meter reading date | 1 | R/W | 0x1212 |
| | 3.non-periodic meter reading date | 2*12 | R/W | 0x1213 |
| | 4.selection valid power amount | 1 | R/W | 0x1214 |
| | 5.selection invalid power amount | 1 | R/W | 0x1215 |
| | 6.selection apparent power amount | 1 | R/W | 0x1216 |
| 2.LP setting (0x122F) | 1.LP channel | 4 | R/W | 0x1221 |
| | 2.LP storing period | 1 | R/W | 0x1222 |
| 3.demand power (0x123F) | 1.demand interval | 1 | R/W | 0x1231 |
| | 2.sub-demand limit period(number) | 1 | R/W | 0x1232 |
| | 3.demand delay time | 1 | R/W | 0x1233 |
| | 4.delay possible power failure time | 1 | R/W | 0x1234 |
| | 5.demand exceeding value setting | 4 | R/W | 0x1235 |
| | 6.setting limit time | 1 | R/W | 0x1236 |
| | 7.EOI closure time | 1 | R/W | 0x1237 |
| | 8.demand reset setting condition | 1 | R/W | 0x1238 |
| | 9.specific date after period | 1 | R/W | 0x1239 |
| | | 1 | R/W | 0x123A |

Fig. 15

| Main item | Detailed items | Memory region | | |
|---|---|---|---|---|
| | | Byte | Type | Code |
| 1.TOU setting (0x131F) | 1.season | 3B*8 | R/W | 0x1311 |
| | 2.holiday | (1+3*8)*8 | R/W | 0x1312 |
| | 3.season based day adaptation | 8*8B | R/W | 0x1313 |
| 2.holiday input (0x132F) | 1.periodic holiday | 3B*20 | R/W | 0x1321 |
| | 2.non-periodic holiday | 5B*20*7 | R/W | 0x1322 |
| 3.sun light saving (0x133F) | 1.sun light saving setting | 1 | R/W | 0x1331 |
| | 2.start month and date | 2 | R/W | 0x1332 |
| | 3.ending month and date | 2 | R/W | 0x1333 |

REMOTE METER READING SYSTEM USING GROUPED DATA STRUCTURE

BACKGROUND OF THE INVENTION

1. Field of the Invention

The present invention relates to a remote meter reading system of an electronic electric power meter, and in particular to a remote meter reading system using a grouped data structure which is capable of classifying a data needed for charging an electric power used and selectively accessing the data.

2. Description of the Background Art

In a conventional remote meter reading system, a data needed for charging a used electric power of a user is directly collected by a meter reader from an electronic electric power meter using a wired or wireless meter reading terminal. The thusly collected data are transmitted to a remote meter reading server through a wired or wireless communication network, an electronic electric power meter transmits the data to a remote meter reading server through a wired or wireless communication network based on a request of a remote meter reading server.

However, in the electronic electric power meter of the above conventional remote meter reading system, since a corresponding company uses its inherent data structure, all data in the electronic electric power meter should be collected at one time whenever a meter reading related data is collected for charging an user's used electric power.

In addition, in the case that all data in the electronic electric power meter are collected at one time whenever the meter reading related data are collected, since the meter reader collects the data needed for an actual meter read together with an unnecessary data, so that a time needed for a meter read is extended, for thereby increasing a work time. In particular, when performing a meter read, since an unnecessary data is stored, a plurality of storing apparatuses are needed. A certain process procedure is needed for selectively processing a corresponding data among a large amount of data collected. Therefore, an expensive equipment is needed.

In the case that a meter reader transmits the collected data to the remote meter reading server at one time through the wired and wireless meter reading terminal or the remote meter reading server receives the collected data from the electronic electric power meter at one time, a probability that a transmission error may occur in a communication network having a limited communication band width like a wireless internet or a low speed power cable communication is increased. In addition, more communication over head may occur when preventing the above problem. Therefore, a transmission efficiency may be decreased when transmitting a large amount of data, and a communication time is extended, so that a communication charge is increased.

In particular, in the case that a communication environment is not stable, a large amount of the data may not be transmitted at one time, so that it is impossible to implement a remote meter reading operation. In the conventional remote meter reading system, a communication speed is decreased for enhancing a reliability of a communication network, and a data transmission amount is limited. Therefore, there is a problem for increasing the use of the remote meter reading system in the conventional art.

SUMMARY OF THE INVENTION

Accordingly, it is an object of the present invention to overcome the problems encountered in the conventional art.

It is another object of the present invention to provide a remote meter reading system using a grouped data structure which is capable of grouping the data having similar functions. Each group is classified into a main item, and each main item is classified into a sub-item, so that the data are selectively accessed for a remote meter read.

To achieve the above objects, in a remote meter reading system which includes an electronic electric power meter in which when a meter reading signal and a meter reading current signal detected by a voltage sensor and a current sensor are converted into a digital data by a digital signal converter, a central processing unit collects the digital data and stores in a memory apparatus and analyzes the digital data and displays an obtained used power amount on a liquid crystal display, and when a data transmission request signal of a wired and wireless meter reading terminal and a remote meter reading server of a meter reader is inputted through an optical port and a communication contact point, the central processing unit transmits the data in the memory apparatus to the wired and wireless meter reading terminal and the remote meter reading server, respectively, there is provided a remote meter reading system using a grouped data structure which includes the central processing unit of the electronic electric power meter in which the digital data having similar functions are collected and grouped, and each group is classified into main items, and each main item is classified into sub-items and is stored in the memory apparatus, and when a data transmission request signal of the wired and wireless meter reading terminal and the remote meter reading server is inputted in accordance with a data address system corresponding to a grouped data stored in the memory apparatus, a collecting data corresponding to the data address system that the data transmission request signal represents is selected, and is transmitted to the wired and wireless meter reading terminal and the remote meter reading server, respectively.

BRIEF DESCRIPTION OF THE DRAWINGS

The present invention will become better understood with reference to the accompanying drawings which are given only by way of illustration and thus are not limitative of the present invention, wherein;

FIG. 3 is a view illustrating a grouped data address system stored in a memory apparatus of an electronic electric power meter according to the present invention;

FIG. 4 is a view illustrating a standard data structure of an electronic electric power meter according to the present invention; and FIGS. 5 through 15 are views illustrating the detailed data structures of an electronic electric power meter according to the present invention.

DETAILED DESCRIPTION OF THE PREFERRED EMBODIMENTS

The preferred embodiments of the present invention will be described with reference to the accompanying drawings.

Figure 1:
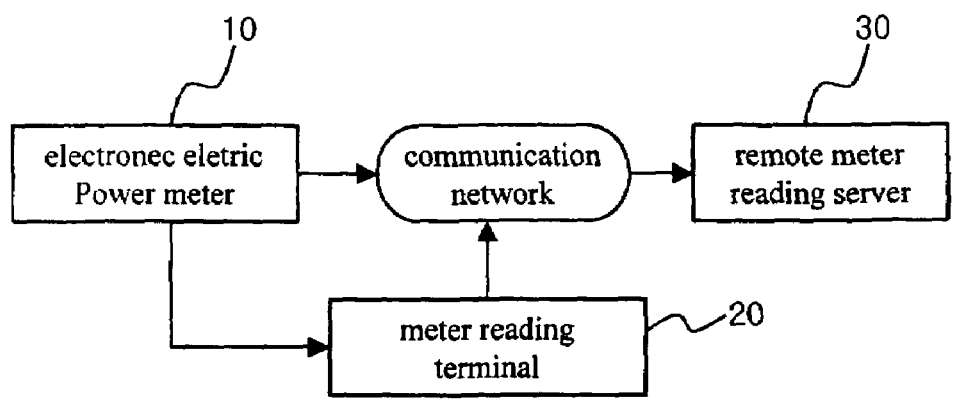
FIG. 1 is a view illustrating the construction of a remote meter reading system using a grouped data address system according to the present invention.
Figure 2:
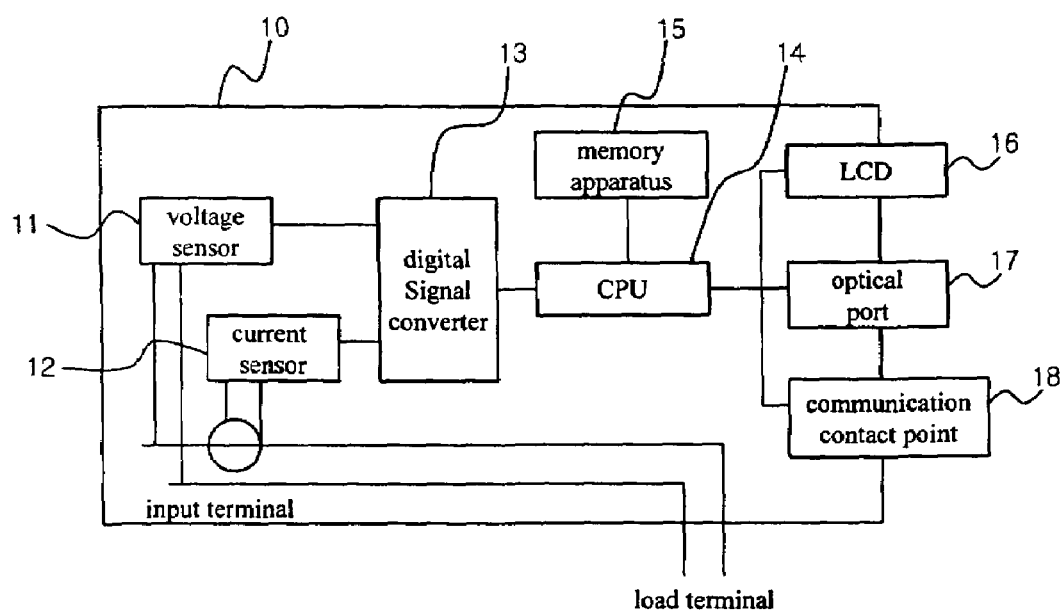
FIG. 2 is a view illustrating the construction of an electronic electric power meter according to the present invention.

Referring to FIGS. 1 and 2, a voltage sensor 11 and a current sensor 12 of an electronic electric power meter 10 according to the present invention are adapted to detect a meter reading voltage signal and a meter reading current signal through an input terminal connected to each load terminal.

A digital signal converter 13 of the electronic electric power meter 10 converts a meter reading voltage signal and a meter reading current signal which are detected by the voltage sensor 11 and the current sensor 12 into a certain digital data.

A central processing unit 14 of the electronic electric power meter 10 collects a digital data inputted through the digital signal converter 13 and stores the same into a memory apparatus 15. The digital data is analyzed, and an amount of the electric power used is displayed on a liquid crystal display 16.

The central processing unit 14 transmits the data collected in the memory apparatus 15 to the wired and wireless meter reading terminal 20 and the remote meter reading server 30 when a data transmission signal of the wired and wireless meter reading terminal 20 and the remote meter reading server 30 of a meter reader is inputted through an optical port 17 and a communication contact point 18.

In particular, when the digital data collected for charging the electric power used is stored in the memory apparatus 15, the central processing unit 14 groups the data having similar functions, and each group is classified into a main item, and each main item is classified into a sub-item.

In addition, the central processing unit 14 selects a collecting data corresponding to a data address system that the data transmission request signal represents, when a data transmission request signal of the wired and wireless meter reading terminal 20 and the remote meter reading server 30 is inputted through the optical port 17 and the communication contact point 18 in accordance with a data address system corresponding to the grouped data stored in the memory apparatus 15 and transmits to the wired and wireless meter reading terminal 20 and the remote meter reading server 30.

Referring to FIG. 3, a data address system that the data transmission signal of the wired and wireless meter reading terminal 20 and the remote meter reading server 30 represents is a 2-byte data address system formed of a 8-bit group field, a 4-bit main item field and a 4-bit sub-item field.

The meter reader selects and receives a certain data needed for a meter read from the electronic electric power meter 10 using the wired and wireless meter reading terminal 20 and re-transmits the received data to the remote meter reading server 30 through a wires and wireless communication network, so that a charging procedure with respect to the user's used electric power is performed by the remoter meter reading server 30.

The operation of the remote meter reading system using a grouped data structure according to the present invention will be described.

The electronic electric power meter 10 according to the present invention stores a meter reading digital data into the memory apparatus 15 so that a meter reader selectively collected a data needed for a meter reading using the meter reading terminal 20 or selectively collects a data needed for the meter reading directly from the remote meter reading server 30.

In the grouped data structure stored in the memory apparatus 15 by the central processing unit 14 of the electronic electric power meter 10, the data transmission request signal of the meter reading terminal 20 and the remote meter reading server 30 is classified and stored based on the data address system as shown in FIG. 3.

When the data transmission request signal is inputted through the optical port 17 or the communication contact point 18 of the electronic electric power meter 10, the central processing unit 14 analyzes the data transmission request signal, confirms the data address system that the data transmission request signal represents, selects the meter reading collection data corresponding to the data address system, and transmits to the meter reading terminal 20 or transmits to the remote meter reading server 30, so that the charging procedure with respect to the user's used electric power is performed.

The grouped data structure and the data address system for selectively accessing the collected data needed for the meter reading will be described in detail.

As shown in FIG. 3, the 2-byte data address system is formed of a 8-bit group field, a 4-bit main item field and a 4-bit sub-item field. Therefore, the data having similar functions are grouped, and each group is classified into the main items, and each main item is classified into sub-items. Therefore, in the present invention, the access method with respect to the meter reading data group stored in the memory apparatus 15 is integrated into one method, and it is possible to effectively access various data groups.

Referring to FIG. 4, the group which is a virtual upper level concept of the data structure stored in the memory apparatus 15 may be classified into a meter setting group, a meter reading setting group, a rate setting group, a guage state group, a meter reading data group, a maximum demand power data group, a reservation meter setting group, a reservation meter reading setting group, and a reservation rate setting group.

Here, the meter setting group to the maximum demand power data are sequentially given by the numbers of 0x01 to 0x06 by the unit of hexadecimal, and the reservation meter setting group related with the reservation to the reservation rate setting group are sequentially given by the numbers of 0x11 to 0x13 by the unit of hexadecimal.

Referring to FIG. 5, the main item of the meter setting group is formed of a LCD setting item, a LCD output item, a model setting item, and a command group item. The instrument setting item to the command group item are sequentially given by the numbers of 0x011 to 0x015 by the unit of hexadecimal.

Here, the instrument setting item is divided into a current program name, a reservation program name, a password having three different rights, an electronic transformer multiple, a Reg K, Scale Factor, Pulse initiator, KYZ divisor, and a pulse width. The current program name to the pulse width are sequentially given by the numbers of 0x0111 to 0x011B by the unit of hexadecimal.

The LCD setting item is divided into an event and error display, a scroll time, a data format, a common mode auto returning time, a blank filling, a date and day display, a time display, a LCD stop for an error, an EOI and DR display duration time. The event and error display to the EOI and DR display duration time are sequentially given by the number of 0x0121 to 0x0129 by the unit of hexadecimal.

The LCD output item is divided into a common mode, a selection mode, and a test mode. The common mode to the test mode are sequentially given by the number of 0x0131 to 0x0133.

The modem setting item is divided into a modem kind and initialization command, a retrial number, a response standby time, a telephone number 1, a telephone number 2, a telephone number 3 and a model transfer rate. The modem kind to the modem communication are sequentially given by the number of 0x0141 to 0x0148 by the unit of hexadecimal.

The command group item is divided into a common function command code and is given by the number of 0x0151 by the unit of hexadecimal.

Referring to FIG. 6, the main item of the meter reading setting group is divided into a meter reading item, a LP setting item, and a demand power item. The meter reading method item to the demand power item are sequentially given by the number of 0x021 to 0x023 by the unit of hexadecimal.

Here, the meter reading method item is divided into a meter reading operation condition and periodic meter reading date, a non-periodic meter reading date, a selection valid power amount, a selection invalid power amount, and a selection apparent power amount. The meter reading operation condition to the selection apparent power amount are sequentially given by the numbers of 0x0211 to 0x216 by the unit of hexadecimal.

The LCD setting item is divided into a LP channel selection and a LP storing interval. The LP channel selection to the LP storing period are sequentially given by the numbers of 0x0221 to 0x0222 by the unit of hexadecimal.

The demand power item is divided into a demand interval and sub-demand period, a demand delay time, a delay possible power failure time, a demand exceeding time setting, a setting limit time, an EOI closure time, a demand reset setting condition, a certain date after period, and a demand power measuring method. The demand interval to the demand power measuring method are sequentially given by the numbers of 0x0231 to 0x023A by the unit of hexadecimal.

Referring to FIG. 7, the main item of the rate setting group is divided into a TOU setting item, a holiday input item and a sun light saving item. The TOU setting item to the sin light saving item are sequentially given by the numbers of 0x031 to 0x033 by the unit of hexadecimal.

Here, the TOU setting item is divided into a season day and a season day. The season to the season are sequentially given by the numbers of 0x0311 to 0x0313 by the unit of hexadecimal.

The holiday input item is divided into a periodic holiday and a non-periodical holiday. The periodic holiday to the non-periodic holiday are sequentially given by the numbers of 0x0321 to 0x322 by the unit of hexadecimal.

The sun light saving item is divided into a sun light saving setting, a start month and date, and a completion month and date. The sun light saving setting to the completion month and date are sequentially given by the numbers of 0x0331 to 0x0333 by the unit of hexadecimal.

Referring to FIGS. 8 and 9, the main item of the gauge state group is divided into a basic item, a meter reading item, an error and event flag item, an error log item, a communication speed item, a power failure item, a common information log item, a LP basic information item, and a communication error log item. The basic item to the communication error log item are sequentially given by the numbers of 0x041 to 0x049 by the unit of hexadecimal.

Here, the basic item is divided into a gauge firm ware version, a gauge ID, a supply method, a current time, a first program setting date and time, a current program setting date and time, and a date and time before change. The gauge firm ware version to the date and time after change are sequentially given by the numbers of 0x0411 to 0x0418 by the unit of hexadecimal.

The meter reading item is divided into a current season, a current date classification, a current rate, a contract demand exceeding record, a contract demand exceeding number, a DR date and time and kind, a DR occurrence number, a meter reading date and time history and kind, a meter reading operation accumulation number, a communication date and time history and kind, and a communication accumulation occurrence number. The current season to the communication accumulation occurrence number are sequentially given by the numbers of 0x421 to 0x042B by the unit of hexadecimal.

The error and event flag item is divided into a gauge error flag, and a gauge event flag. The gauge error flag and the gauge even flag are sequentially given by the numbers of 0x431 to 0x0442 by the unit of hexadecimal.

The error log item is divided into a gauge error accumulation occurrence number, a gauge error log, and a gauge error recovery log. The gauge error accumulation occurrence number to the gauge error recovery log are sequentially given by the numbers of 0x0441 to 0x0443 by the unit of hexadecimal.

The communication speed item is divided into a modem speed and an optical port. The modem speed and the optical port are sequentially given by the numbers of 0x0451 to 0x0452 by the unit of hexadecimal.

The power failure item is divided into a power failure accumulation time, a last power failure recovery history, a power failure occurrence number, a battery remaining period, and a battery exchange date and time. The power failure accumulation time to the battery exchange date and time are sequentially given by the numbers of 0x0461 to 0x0466 by the unit of hexadecimal.

The common information log item is divided into a forward direction instantaneous valid power, a reverse direction instantaneous valid power, a ground instantaneous valid power, a phase advanced instantaneous invalid power, an instantaneous apparent power, an instantaneous power, an instantaneous current, a current energy upper limit, an instantaneous power factor, an instantaneous frequency, and a battery volt. The forward direction instantaneous valid power to the battery bolt are sequentially given by the numbers of 0x0471 to 0x047B by the unit of hexadecimal.

The LP basic information item is divided into a LP start time, a LP end time, a LP accumulation case number, and a LP overlap count. The LP start to the LP overlap count are sequentially given by the numbers of 0x0481 to 0x0484 by the unit of hexadecimal.

The communication error log item is divided into a communication error accumulation number, a communication error log, and a communication error recovery log. The communication error accumulation number to the communication error recovery are sequentially given by the numbers of 0x0491 to 0x0493 by the unit of hexadecimal.

Referring to FIGS. 10 and 11, the main item of the meter reading data group is divided into an energy item, a demand power item, an accumulation demand power item, a con tenuous accumulation demand power item, a maximum demand occurrence date and time item, a maximum continuous accumulation demand occurrence date and time item, a demand power occurrence power factor 1 item, a demand power occurrence power factor 2 item, an average power factor 1 item, an average power factor 2 item, a previous time limit demand power item, and a maximum demand power occurrence history item. The energy item to the maximum demand power occurrence history item are sequentially given by the numbers of 0x051 to 0x05C by the unit of hexadecimal.

Here, the energy item is divided into a current month, a month before one month, a month before two months, a month before three months, a month before four months, a month before five months, and a month before six months. The current month to the month before six months are sequentially given by the numbers of 0x0511 to 0x0517 by the unit of hexadecimal.

The demand power item is divided into a current month, a month before one month, a month before two months, a month before three months, a month before four months, a month before five months, and a month before six months. The current month to the month before six months are sequentially given by the numbers of 0x0521 to 0x0527 by the unit of hexadecimal.

The accumulation demand power item is divided into a current month, a month before one month, a month before two months, a month before three months, a month before four months, a month before five months, and a month before six months. The current month to the month before six months are sequentially given by the numbers of 0x0531 to 0x0537 by the unit of hexadecimal.

The continuous accumulation demand power item is divided into a current month, a month before one month, a month before two months, a month before three months, a month before four months, a month before five months, and a month before six months. The current month to the month before six months are sequentially given by the numbers of 0x0541 to 0x0547 by the unit of hexadecimal.

The maximum demand occurrence date and time item is divided into a current month, a month before one month, a month before two months, a month before three months, a month before four months, a month before five months, and a month before six months. The current month to the month before six months are sequentially given by the numbers of 0x0551 to 0x0557 by the unit of hexadecimal.

The maximum continuous accumulation demand occurrence date and time item is divided into a current month, a month before one month, a month before two months, a month before three months, a month before four months, a month before five months, and a month before six months. The current month to the month before six months are sequentially given by the numbers of 0x0561 to 0x0567 by the unit of hexadecimal.

The demand power occurrence power factor item is divided into a current month, a month before one month, a month before two months, a month before three months, a month before four months, a month before five months, and a month before six months. The current month to the month before six months are sequentially given by the numbers of 0x0571 to 0x0577 by the unit of hexadecimal.

The demand power occurrence power factor 2 item is divided into a current month, a month before one month, a month before two months, a month before three months, a month before four months, a month before five months, and a month before six months. The current month to the month before six months are sequentially given by the numbers of 0x0581 to 0x0587 by the unit of hexadecimal.

The average power factor 1 item is divided into a current month, a month before one month, a month before two months, a month before three months, a month before four months, a month before five months, and a month before six months. The current month to the month before six months are sequentially given by the numbers of 0x0591 to 0x0597 by the unit of hexadecimal.

The average power factor 2 item is divided into a current month, a month before one month, a month before two months, a month before three months, a month before four months, a month before five months, and a month before six months. The current month to the month before six months are sequentially given by the numbers of 0x05A1 to 0x05A7 by the unit of hexadecimal.

The previous time limit demand power item is divided into a demand power and a power factor. The demand power and the power factor are given by the numbers of 0x05B1 and 0x05B2.

The maximum demand power occurrence history item is divided into an occurrence date, a demand power, and a power factor. The occurrence date to the power factor are given by the numbers of 0x05C1 to 0x05C3.

Referring to FIG. 12, the main item of the LP data group is divided into a 15 min LP data item, a one hour LP date item, a one day LP data item, a one week LP data item, a 30 days LP data item, a 90 days LP date item, and an entire LP data item. The 15 min LP data item is given by the number of 0x0611 by the unit of hexadecimal, and the one hour LP data item is given by the number of 0x0621 by the unit of hexadecimal, and the one day LP data item is given by the number of 0x0631 by the unit of hexadecimal, and the one week LP data item is given by the number of 0x0641 by the unit of hexadecimal, and the 30 days LP data item is given by the number of 0x0651 by the unit of hexadecimal, and the 90 days LP data item is given by the number of 0x0661 by the unit of hexadecimal, and the entire data item is given by the number of 0x06F1 by the unit of hexadecimal.

Referring to FIG. 13, the main item of the reservation gauge setting group is divided into an instrument setting item, a LCD setting item, a LCD output item, a modem output item, a modem setting item, and a command group item. The instrument setting item to the command group item are sequentially given by the numbers of 0x111 to 0x115 by the unit of hexadecimal.

Here, the instrument setting item is divided into a current program name, a reservation program name, a password having three different rights, an electronic transformer multiple, a Reg K, Scale factor, a pulse initiator, KYZ divisor, and a pulse width. The current program name to the pulse width are sequentially given by the numbers of 0x1111 to 0x111B by the unit of hexadecimal.

The LCD setting item is divided into an event, an error display, a scroll time, a data format, a common mode auto returning time, a blank filling, a date display, a time display, a LCD stop for error, and an EOI and DR display duration time. The event and error display to the EOI and DR display duration time are sequentially given by the numbers of 0x1121 to 0x1129 by the unit of hexadecimal.

The LCD output item is divided into a common mode, a selection mode, and a test mode. The common mode to the test mode are sequentially given by the numbers of 0x1131 to 0x1133 by the unit of hexadecimal.

The modem setting item is divided into a modem kind, an initialization command, a retrial number, a response standby time, a telephone number 1, a telephone number 2, a telephone number 3, and a modem communication speed. The modem kind to the modem communication speed are sequentially given by the numbers of 0x1141 to 0x1148 by the unit of hexadecimal.

The command group item is divided into a common function command code. The common function command code is given by the numbers of 0x1151 by the unit of hexadecimal.

Referring to FIG. 14, the main item of the reservation meter reading setting group is divided into a meter reading method item, a LP setting item, and a demand power item. The meter reading method item to the demand power item are sequentially given by the numbers of 0x121 to 0x123 by the unit of hexadecimal.

The meter reading method item is divided into a meter reading operation condition, a periodic meter reading date, a non-periodic meter reading date, a selection valid power amount, a selection invalid power amount, and a selection apparent power amount. The meter reading operation condition to the selection apparent power amount are sequentially given by the numbers of 0x1211 to 0x1216 by the unit of hexadecimal.

The LCD setting item is divided into a LP channel selection and a LP storing interval. The LP channel selection and the LP storing are sequentially given by the numbers of 0x221 and 0x1222.

The demand power item is divided into a demand interval, a sub-demand time limit, a demand delay time, a demand possible power failure time, a demand exceeding value setting, a setting limit time, EOI closure time, a demand reset setting condition, a specific date after period, and a demand power measuring method. The demand interval to the demand power measuring method are sequentially given by the numbers of 0x1231 to 0x123A by the unit of hexadecimal.

Referring to FIG. 15, the main item of the reservation rate setting group is divided into a TOU setting item, a holiday input item, and a sun light saving item. The TOU setting item to the sun light saving item are sequentially given by the numbers of 0x131 to 0x133 by the unit of hexadecimal.

Here, the TOU setting item is divided into a season, a day, and a season based day adaptation. The season to the season based day adaptation are sequentially given by the numbers of 0x1311 to 0x1313 by the unit of hexadecimal.

The holiday input item is divided into a periodic holiday and a non-periodic holiday. The periodic holiday and the non-periodic holiday are sequentially given by the numbers of 0x1321 to 0x1322 by the unit of hexadecimal.

The sun light saving item is divided into a sun light saving setting, a start month and date and an ending month and date. The sun light saving setting to the ending month and date are sequentially given by the numbers of 0x1331 to 0x1333 by the unit of hexadecimal.

As described above, in the remote meter reading system using a grouped data structure according to the present invention, the data having similar functions are grouped, and each group is classified into main items, and each main item is classified into sub-items, so that it is possible to selectively access the data during a remote meter reading. Therefore, when the meter reader collects the data of the electronic electric power meter at the current place, the meter reader collects only a needed data for thereby decreasing the time needed for the meter reading. A work time is decreased. In addition, only the data needed for the work is stored for thereby saving the space of the storing apparatus. Since the work is performed by receiving only the data, an expensive apparatus is not needed in the present invention.

In particular, in the remote meter reading system using a grouped data structure, since only the data needed for processing a corresponding work is transmitted, so that it is possible to minimize the occurrence possibility of the transmission error and to decrease an unnecessary communication over head even when the collected data are transmitted through a communication network having a limited communication band width like a conventional wireless internet or a low speed power cable communication.

In addition, in the remote meter reading system using a grouped data structure according to the present invention, since a meter reading time needed for one electronic electric power meter is decreased, it is possible to read more meters compared to the conventional remote meter reading system during the same time, and a cost is significantly decreased.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a remote meter reading system which includes an electronic electric power meter in which when a meter reading signal and a meter reading current signal detected by a voltage sensor and a current sensor are converted into a digital data by a digital signal converter, a central processing unit collects the digital data and stores in a memory apparatus and analyzes the digital data and displays an obtained used power amount on a liquid crystal display, and when a data transmission request signal of a wired and wireless meter reading terminal and a remote meter reading server of a meter reader is inputted through an optical port and a communication contact point, the central processing unit transmits the data in the memory apparatus to the wired and wireless meter reading terminal and the remote meter reading server, respectively, a remote meter reading system using a grouped data structure, comprising:

said central processing unit of the electronic electric power meter in which the digital data having similar functions are collected and grouped, and each group is classified into main items, and each main item is classified into sub-items and is stored in the memory apparatus, and when a data transmission request signal of the wired and wireless meter reading terminal and the remote meter reading server is inputted in accordance with a data address system corresponding to a grouped data stored in the memory apparatus, a collecting data corresponding to the data address system that the data transmission request signal represents is selected, and is transmitted to the wired and wireless meter reading terminal and the remote meter reading server, respectively.

2. The system of claim 1, wherein a data address system that a data transmission request signal of the wired and wireless meter reading terminal and the remote meter reading server represents is a 2-byte data address system formed of a 8-bit group field, a 4-bit main item field and a 4-bit sub-item field.

* * * * *